Jan. 9, 1934.     H. M. E. SACHS     1,942,775
OPTICAL LENS AND METHOD OF MAKING SAME
Filed March 10, 1932
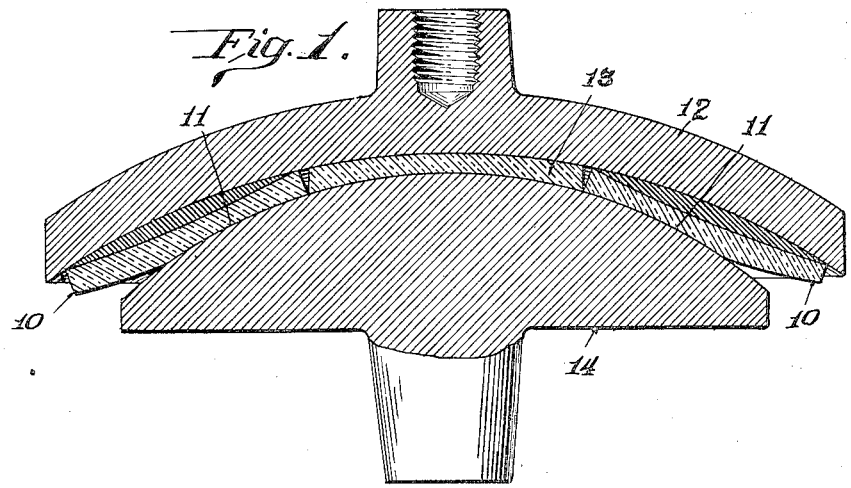
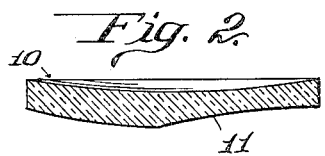
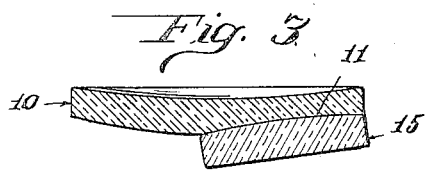
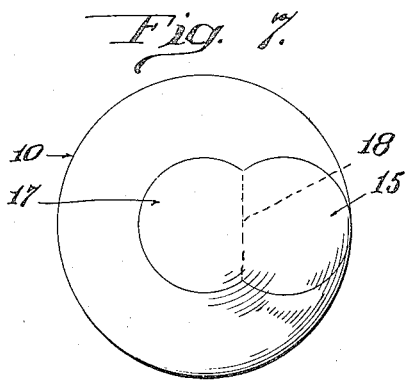
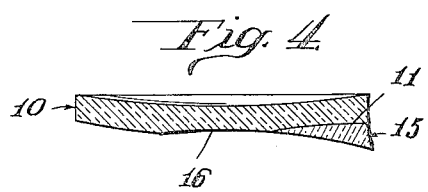
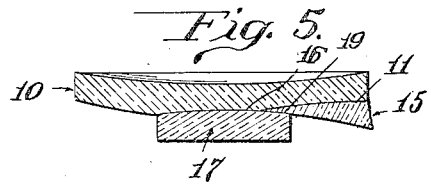
Inventor
Henry M. E. Sachs,
Witnesses Patented Jan. 9, 1934

1,942,775

UNITED STATES PATENT OFFICE 1,942,775

OPTICAL LENS AND METHOD OF MAKING SAME

Henry M. E. Sachs, South Bend, Ind., assignor of one-half to Robert Malcom, Chicago, Ill.

Application March 10, 1932. Serial No. 597,942

3 Claims. (Cl. 88—54)

My invention relates to the improved construction of a multifocal lens in which the reading or near vision portion of the lens is not only properly disposed for such purpose, but the serious objection to the usual bifocal lens resulting from the decided differences in the refractive qualities or indices of the different portions or regions of the lens and the abrupt step from one to the other is eliminated. That is to say, my invention contemplates a lens of the bifocal type involving a major region or portion suitable for distance or general vision and a segment portion adapted for near vision integrally secured in a predetermined part of the major portion in such manner as to provide a more or less gradual step or blending refractive relation at the juncture of the two portions of the lens.

The objects and advantages of my invention will be more fully comprehended from the following detailed description of the accompanying drawing wherein:

Figure 1 is a sectional diagrammatic view illustrating the method of grinding one of the recesses in a plurality of lens-blanks.

Figure 2 is an edge view of one of the ground lens-blanks resulting from the grinding operation disclosed in Figure 1.

Figure 3 is an edge view of the lens-blank of Figure 2 provided with an added disc or glass "button", illustrating the second step in the method.

Figure 4 is a similar view of the blank and added "button", ground to provide the central recess, illustrating the third step in the method.

Figure 5 is a similar view showing the central recess provided with a second disc or glass "button", illustrating the fourth step.

Figure 6 is a similar view of the blank and the added discs or "buttons" ground down flush with the surface of the main blank, illustrating the fifth and final step in the method.

Figure 7 is a face or plan view of my improved bifocal lens.

Bifocal lenses as heretofore made have been found quite objectionable because of the decided "jump" resulting at the juncture of the distance vision and near vision regions of the lens because the indices of refraction of the two regions are of a decided dissimilar power. As a result, there is a marked line or decided "jump" in displacement of the object, causing considerable eye strain and difficulty.

My invention has for its object the provision of a multifocal lens adapted to overcome this serious difficulty, namely a lens wherein the juncture between the distance vision and the near vision regions of the lens will involve a region having an index of refraction intermediate of the dissimilar powers of the distance vision and near vision regions; said intermediate region having refractive indices gradually approaching or blending, respectively, into the distance and near vision regions of the lens, and at the same time practically free from chromatic difficulties.

In the making of my improved lens, the lens-blank 10 at a predetermined point, namely intermediate of the geometrical center or axis and the perimeter and on the convex side of the lens-blank, is provided with a countersink or recess as at 11 in Figure 2. This countersink 11 is of arcuate formation to provide a concaved recess having its greatest depth considerably removed from the lens-blank perimeter.

The countersink 11 is preferably simultaneously produced in a plurality of blanks 10 which are properly glued or secured on the dished or concaved side of a suitable block 12, with the concaved sides of similar concavo-convex blanks disposed toward the block 12 as shown in Figure 1.

The block 12 is adapted to receive a plurality of lens-blanks of the size shown in Figure 2; the block 12 being of a certain radius in keeping with the nature or proportion of the countersink desired to be ground in the main lens or blank 10. The dished side of the block is centrally provided with an annular dummy blank as at 13 of predetermined diameter and the lens-blanks then circumferentially disposed thereabout in abutting relation with the centering dummy in order that countersinks or recesses 11 of equal nature and similar diameters may be simultaneously ground in all of the lens-blanks by the grinding tool indicated at 14.

It will be understood that the grinding machine, namely the block and tool, are rotatably and oscillatably mounted and operated in any of the well known manners, except that I prefer to invert the lens-blank holding block over the grinding tool as illustrated in Figure 1.

After the blanks have been sufficiently ground to provide the desired countersinks 11 in the respective blanks, I then provide the countersink 11 with a correspondingly sized button 15, see Figure 3, having a convexed side corresponding to the concavity of the countersink 11.

The depth of the recess and therefore the radius of the button are in keeping with the refractive quality desired in the near vision region of the lens.

The button 15, which comprises a piece of glass having a selected index of refraction of greater power than that of the major portion or blank 10, is then intimately secured to the blank or fused in place to form an integral lens.

The blank 10 with its button 15 is then placed in a suitable rotating block with the concaved side of the lens disposed toward the block so that the convexed or button holding side may be operated on by a suitable grinding tool of well known type. The lens blank 10 is so arranged in a block of proper radius that the blank 10 with the button 15 may be ground to provide an annular depression or countersink as at 16 in Figure 4; this operation at the same time resulting in grinding away the upper portion of the button 15 as shown in Figure 4. The radius of the second countersink 16 is such that this countersink will preferably lap a considerable part of the upper portion of the first mentioned countersink 11 and hence will therefore also lap a segmental portion of the button 15. In grinding this central or second depression 16, a segmental portion at the upper part of the first button 15, between its arc and the chord indicated in dotted lines at 18 in Figure 7, will be practically ground away; while a portion of the first button 15 between the dotted line chord 18 and the center of the button 15 will be ground down as shown at 19 in Figure 6.

This second or central countersink 16, of predetermined radius, is also dished to a predetermined degree to receive the correlated convexed side of a second button 17, as shown in Figure 5.

The second button 17 is intended to be of the same refractive power as the main lens 10 and therefore having the index of refraction desired in the far vision region of the lens.

The second button 17, like button 15, is cemented or fused in the countersink into intimate relation with the main blank or lens so as to leave no air spots therebetween.

The second button 17 is of a diameter sufficient to partly overlap the upper segmental ground portion of the first mentioned button 15, as shown in Figure 5.

The blank 10 with the intimately united or fused buttons 15 and 17 is then placed in a suitable grinding machine and the protruding portions of both buttons then ground down flush with the surface of the main blank so as to provide the smooth convexed face or surface of the completed lens-blank as shown in Figure 6; it being understood that when the completed lens has been polished the junctures between the blank and buttons are practically invisible.

In my improved lens it is apparent that glass of the same refractive index as the major or distance vision region is arranged in overlapping relation with the upper segment of the near vision region or button, with the said overlapping portion of the distance vision glass gradually diminishing or tapering down to a feather-edge, as shown at 20 in Figure 6.

As a result, there is a gradual blending in refractive powers between the distance vision region of the lens and the near vision region and consequently there is no decided step or pronounced "jump" between the two regions of the bifocal lens.

The specific embodiment of the invention and what is believed to be the best method of producing same have been described in terms employed for purposes of description and not as terms of limitation as modifications are possible without, however, departing from the spirit of my invention.

What I claim is:

1. A method of making optical lenses which consists in providing a major lens of preselected index of refraction adapted for distance vision and having an exterior convex surface with an eccentrically disposed arcuate depression of preselected depth; filling said depression with a button having a lower convexed surface corresponding to the basal curvature of said depression and composed of glass having an index of refraction adapted for near vision; intimately securing the button to the major lens; thence providing the major lens with an arcuate depression concentric with the axis of the major lens and having a radius extending part way into said button and terminating above the axis of said button; filling said concentric depression with a button having the same refraction index as the major lens and with a convex lower face corresponding to the basal curvature of said last mentioned depression and intimately securing the same to the major lens and to said first mentioned button; and then finishing the outer face of the composite lens to one continuous curve with the exterior surfaces of both buttons disposed in the plane of the complete lens.

2. An optical lens comprising a major portion of preselected index of refraction for distance vision and having a convex exterior surface; a minor portion of index of refraction different from that of the major portion, for near vision, disposed intermediate of the axis of the major portion and an edge of the major portion and extending to said edge, said minor portion being intimately connected to the major portion; and a third portion of the same index of refraction as said major portion and of transverse dimension less than the transverse dimension of said minor portion and arranged substantially at the axial center of the major portion and overlapping the adjacent part of the minor portion, said third portion being intimately connected with the major portion and the overlapped part of the minor portion; the exterior surfaces of the minor and third portions being entirely disposed in the plane of the convex surface of the major portion.

3. An optical lens comprising a major crown glass portion of preselected refractive index with a convex anterior surface, provided with a circular concaved countersink of prescribed radius extending substantially from the axis to one edge of said major portion; a circular minor flint glass portion of different refractive index for near vision, coextensive with the countersink and having a posterior convex surface of prescribed radius corresponding with the basal curvature of the countersink and intimately secured therein; a second arcuate and concave countersink substantially concentrically formed in the major portion and of radius adapted to extend part way into said minor portion, the basal curvature of the countersink sloping continuously outward toward the perimeter of the countersink; and a third annular crown glass portion of the same refractive index as the major portion, having a posterior convex surface corresponding with the basal curvature of said last mentioned countersink and arranged to partly overlap the upper segmental part of said minor portion intermediate of the center and the perimeter of said minor portion, said third portion being intimately secured to the major portion and to the minor portion.

HENRY M. E. SACHS.